United States Patent

Sakai et al.

[11] Patent Number: 5,831,962
[45] Date of Patent: Nov. 3, 1998

[54] OPTICAL PICKUP CARRYING SYSTEM

[75] Inventors: Tsunemi Sakai; Shigehiro Itou; Naohiko Obata, all of Tokyo, Japan

[73] Assignee: Mitsubishi Denki Kabushiki Kaisha, Tokyo, Japan

[21] Appl. No.: 779,148

[22] Filed: Jan. 3, 1997

[30] Foreign Application Priority Data

Sep. 3, 1996 [JP] Japan ..................................... 8-233077

[51] Int. Cl.⁶ ........................... G11B 21/16; G11B 21/02
[52] U.S. Cl. ........................ 369/219; 369/244; 369/249
[58] Field of Search ................................. 369/215, 218, 369/219, 220, 223, 224, 244, 249; 384/13

[56] References Cited

U.S. PATENT DOCUMENTS

| | | | |
|---|---|---|---|
| 4,105,267 | 8/1978 | Mori | 384/291 |
| 5,380,096 | 1/1995 | Tanaka | 384/13 |
| 5,380,097 | 1/1995 | Tanaka | 384/13 |

FOREIGN PATENT DOCUMENTS

| | | |
|---|---|---|
| 61-168436 | 7/1986 | Japan . |
| 62-78782 | 4/1987 | Japan . |
| 62-250564 | 10/1987 | Japan . |
| 63-029381 | 2/1988 | Japan . |
| 5-332358 | 12/1993 | Japan . |
| 6-302129 | 10/1994 | Japan . |
| 7-287138 | 10/1995 | Japan . |

Primary Examiner—Stuart S. Levy
Assistant Examiner—William J. Klimowicz

[57] ABSTRACT

An optical pickup carrying system includes a base on which a turn table can be disposed rotatably for placing a disk thereon, an optical pickup movably disposed in the base for reading a signal recorded on the disk, a guide rail disposed in the base and provided with sliding surfaces on which a level positioning member secured to the optical pickup and a plate spring can slide, respectively, for guiding and supporting the optical pickup in cooperation with the level positioning member and plate spring when the optical pickup moves, and a groove formed in the sliding surface for storing grease.

4 Claims, 11 Drawing Sheets

OPTICAL PICKUP CARRYING SYSTEM

BACKGROUND OF THE INVENTION

1. Field of the Invention

The present invention relates to an optical pickup carrying system used for a disk playback device.

2. Description of the Prior Art

Referring now to FIG. 14, there is illustrated a perspective view of a prior art optical pickup carrying system. Furthermore, FIG. 15 shows a bottom view of the prior art optical pickup carrying system, FIG. 16 shows a side view of the prior art optical pickup carrying system, FIG. 17 shows a perspective view showing a main part of a guide rail of the prior art optical pickup carrying system, and FIG. 18 shows a cross-sectional view of a main part of a slide portion of the prior art optical pickup carrying system.

In these figures, reference numeral 101 denotes a base, 102 denotes a turn table on which a disk 103 such as a CR-ROM can be placed, and 104 denotes a spindle motor secured to the base 101, for rotating the turn table 102.

Furthermore, reference numeral 105 denotes an optical pickup for reading a signal recorded on the disk 103, 106 denotes a thread motor which serves as a driving source for moving the optical pickup 105, 107 denotes a motor base for securing the thread motor 106 to the base 101, 108 denotes a gear fixed on the rotary shaft of the thread motor 106, and 109 denotes a gear rotatably mounted on a shaft secured to the motor base 107.

In addition, reference numeral 110 denotes a screw shaft having a gear 111 engaged with the gear 109 at one end thereof. The shaft can rotate together with the gear 111. The thread of the screw shaft 110 is engaged in a nut 112 secured to the optical pickup 105 so as to carry the optical pickup 105.

Reference numeral 113 denotes a plate spring for imposing a certain load on the screw shaft 110 in the thrust direction so as to hold the screw shaft 110, and 114 denotes a guide rail which is formed integrally with the base 101 and on which a level positioning member 115 of the optical pickup 105 and a plate spring 116, which will be mentioned below, can slide. The guide rail 114 has upper and lower sliding surfaces 114a and 114b. The plate spring 116 is attached to the bottom part of the optical pickup 105 to urge the level positioning member 115 toward the guide rail 114 so as to support the optical pickup 105. Furthermore, reference numeral 118 denotes grease which is applied to the sliding surfaces 114a and 114b of the guide rail 114.

Next, a description will be made as to the operation of the prior art pickup carrying system. When the optical pickup 105 reads data from a position on a surface of the disk 103, a driving voltage from a control circuit board not shown is applied to the thread motor 106 to produce a driving force in the thread motor 106 which is then transmitted to the screw shaft 110 by way of the gears 108, 109, and 111, and therefore causes the screw shaft 110 to rotate.

When the screw shaft 110 rotates so that the optical pickup 105 having the nut 112 engaged with the screw shaft 110 is moved to the above position in the radial direction of the disk 103, the optical pickup 105 reads data from the above position of the disk 103. During the movement of the optical pickup 105, the level positioning member 115 and plate spring 116 slide on the sliding surfaces 114a and 114b of the guide rail 114, respectively. Accordingly, upward and downward movements of the optical pickup 105 can be restricted by the level positioning member 115 and plate spring 116. The grease 118 in the gaps between the sliding surfaces 114a and 114b and the level positioning member 115 and plate spring 116 can serve to reduce the resistance to the sliding movements of the level positioning member 115 and plate spring 116 against the guide rail 114.

An extended period of use of or playing back disks many times in a disk playback device including such the prior art optical system having the above-mentioned structure causes a decrease in the amount of the grease 118, which serves as a lubricating agent, due to a spill and scattering of the grease, because the level positioning member 115 and plate spring 116 of the optical pickup 105 slide on the guide rail 114 many times. Accordingly, the level positioning member 115, plate spring 116, and sliding surfaces 114a and 114b become susceptible to wear. Therefore, a problem is that the accuracy of positioning the optical pickup 105 cannot be maintained and hence the capability of reading data from the disk is reduced.

SUMMARY OF THE INVENTION

The object of the present invention is to overcome the above problem. More precisely, it is an object of the present invention to provide an optical pickup carrying system capable of preventing a decrease in the amount of a lubricating agent at the sliding portion thereof and hence wear in the sliding portion, thereby maintaining the accuracy of positioning the optical pickup.

It is another object of the present invention to provide an optical pickup carrying system capable of decreasing the resistance to sliding movements of the optical pickup.

It is a further object of the present invention to provide an optical pickup carrying system capable of preventing the lubricating agent from flowing over either of the longitudinal edge portions of one sliding surface of the guide rail.

In accordance with the present invention, there is provided an optical pickup carrying system including a base on which a turn table can be disposed rotatably for placing a recording medium shaped like a disk thereon, an optical pickup movably disposed in the base for reproducing a signal from the disk-shaped recording medium, a support mechanism disposed in the optical pickup for supporting the optical pickup so that it can move on the base, a guide rail disposed in the base and provided with at least a sliding surface on which the support mechanism can slide when the optical pickup moves, for guiding and supporting the optical pickup in cooperation with the support mechanism, and a lubricating agent storing mechanism formed in the guide rail for storing a lubricating agent to furnish it to the sliding surface.

In accordance with a preferred embodiment of the present invention, the guide rail has upper and lower sliding surfaces on which the support mechanism can slide, and the lubricating storing mechanism furnishes the lubricating agent to at least one of the two sliding surfaces.

In accordance with another preferred embodiment of the present invention, the lubricating agent storing mechanism is at least one groove formed in at least one of the two sliding surfaces and running in parallel with a direction of moving the optical pickup.

In accordance with another preferred embodiment of the present invention, the lubricating agent storing mechanism includes at least one groove formed in the upper sliding surface and running in parallel with the direction of moving the optical pickup, and at least one groove formed in the lower sliding surface and running in parallel with the direction of moving the optical pickup.

In accordance with another preferred embodiment of the present invention, the lubricating agent storing mechanism includes at least one row of cavities formed in at least one of the two sliding surfaces and running in parallel with the direction of moving the optical pickup.

In accordance with another preferred embodiment of the present invention, the lubricating agent storing mechanism includes at least one row of cavities formed in the upper sliding surface and running in parallel with the direction of moving the optical pickup, and at least one row of cavities formed in the lower sliding surface and running in parallel with the direction of moving the optical pickup.

In accordance with another preferred embodiment of the present invention, the guide rail includes a pair of projecting portions projected from both of longitudinal sides of the sliding surface, and the support mechanism includes a pair of notch portions through which the pair of projecting portions can be passed when the optical pickup moves.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
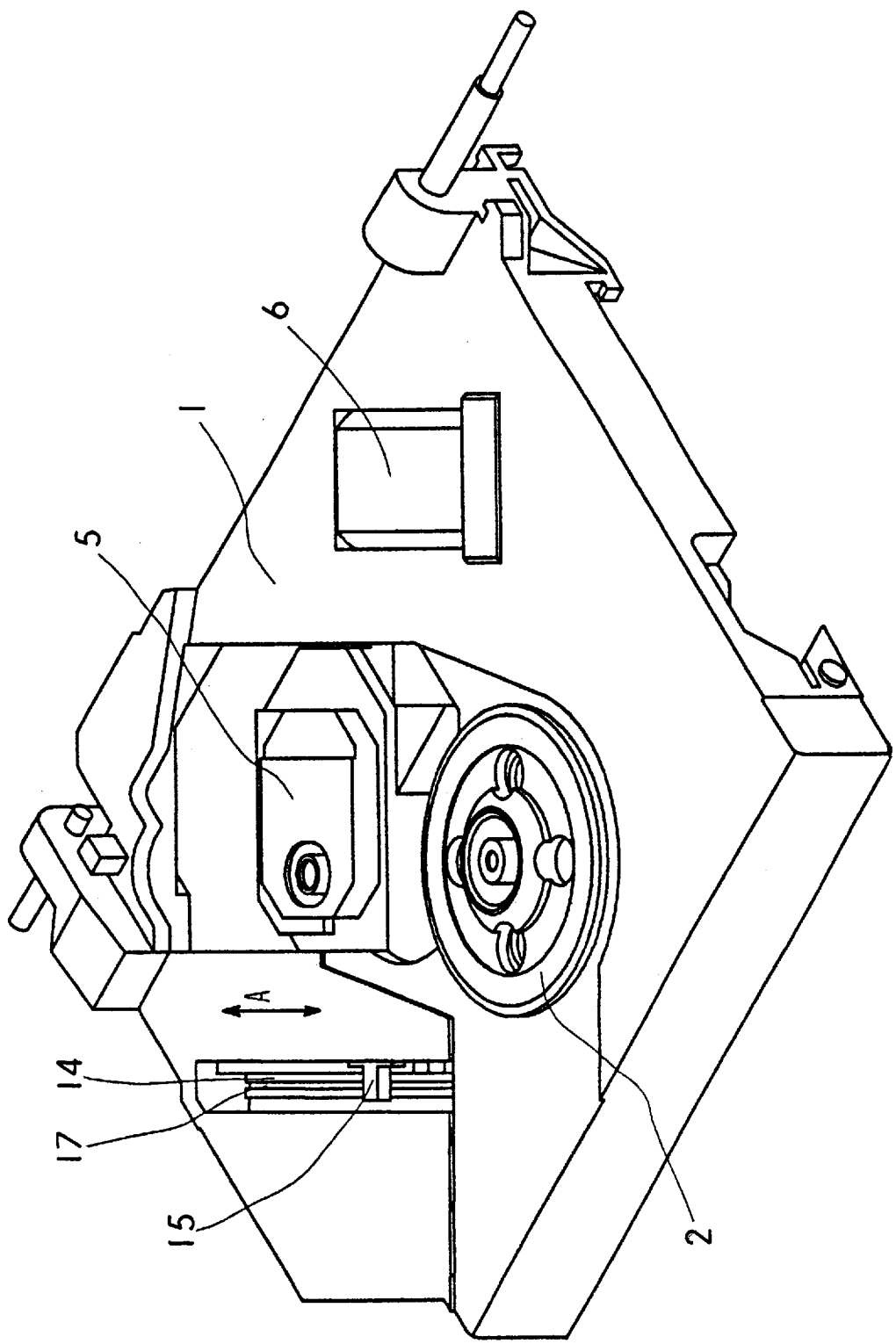
FIG. 1 is a perspective view showing an optical pickup carrying system according to a first embodiment of the present invention.
Figure 2:
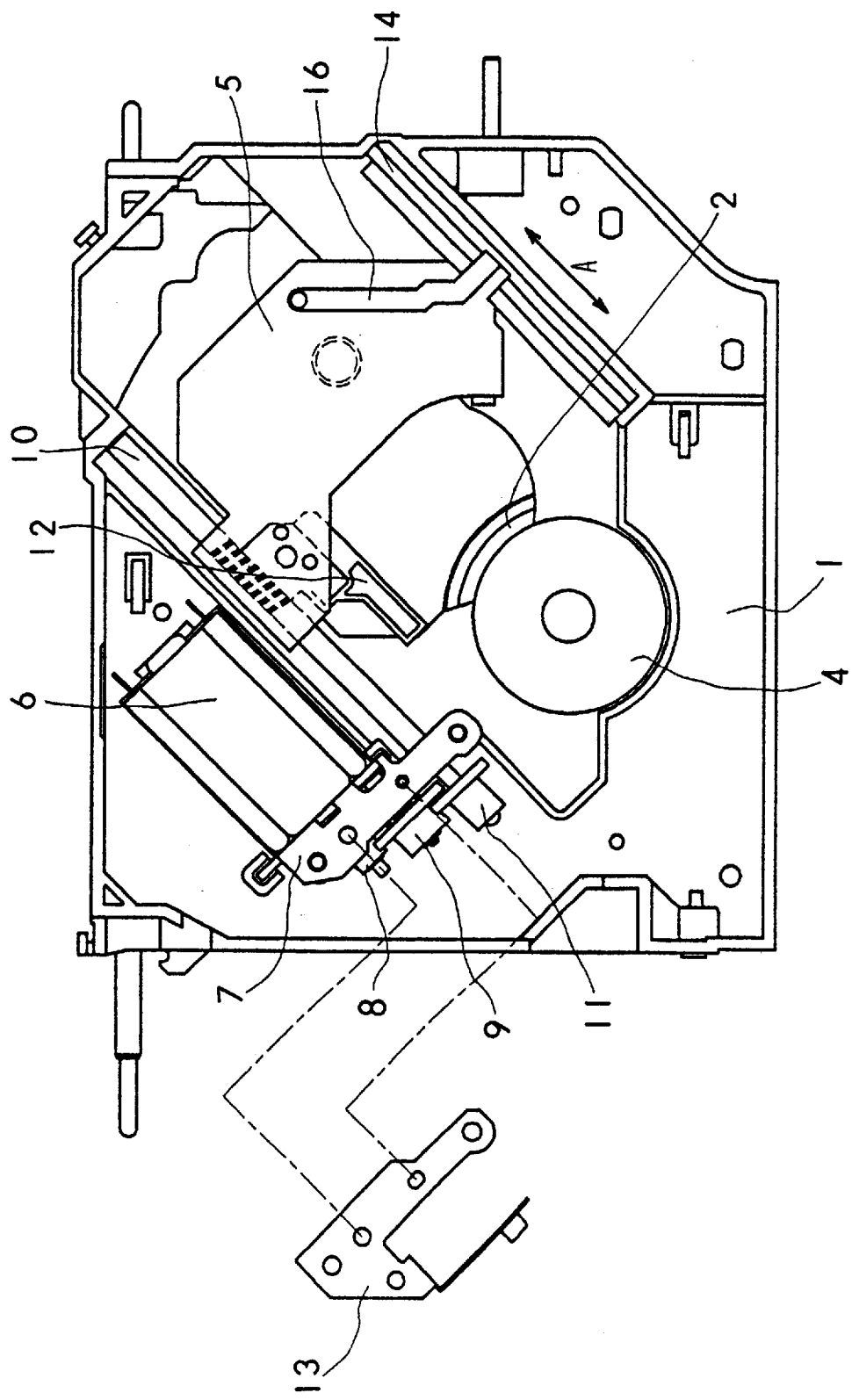
FIG. 2 is a bottom view of the optical pickup carrying system of the first embodiment shown in FIG. 1.
Figure 3:
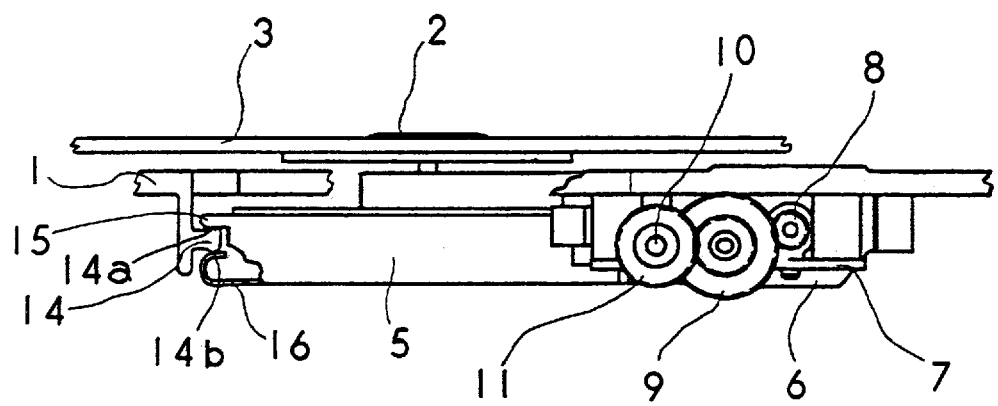
FIG. 3 is a side view of the optical pickup carrying system of the first embodiment shown in FIG. 1.
Figure 4:
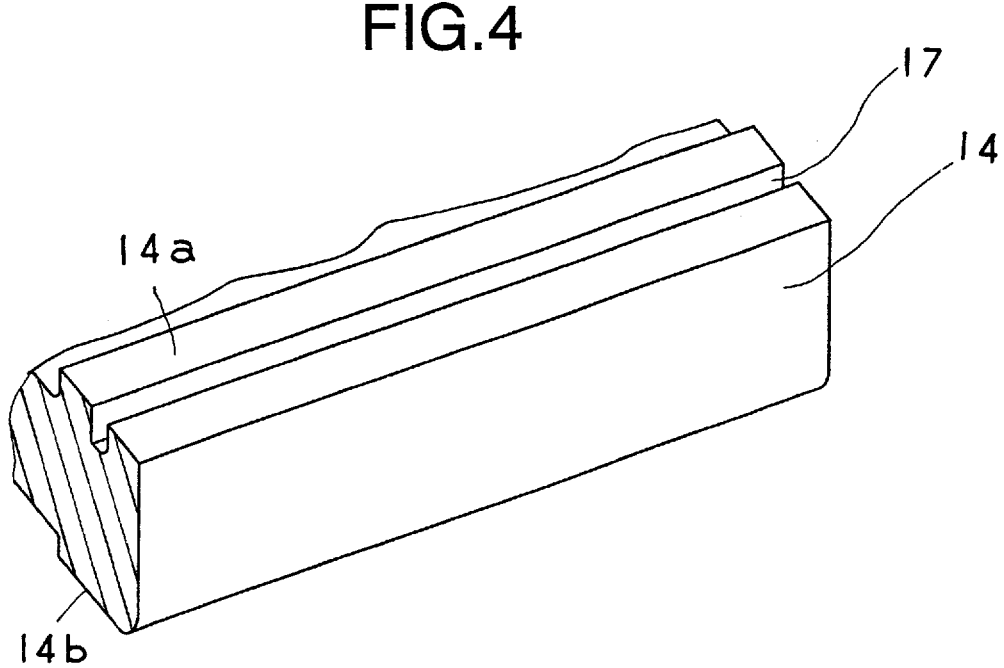
FIG. 4 is a perspective view showing a main part of a guide rail of the optical pickup carrying system of the first embodiment shown in FIG. 1.
Figure 5:
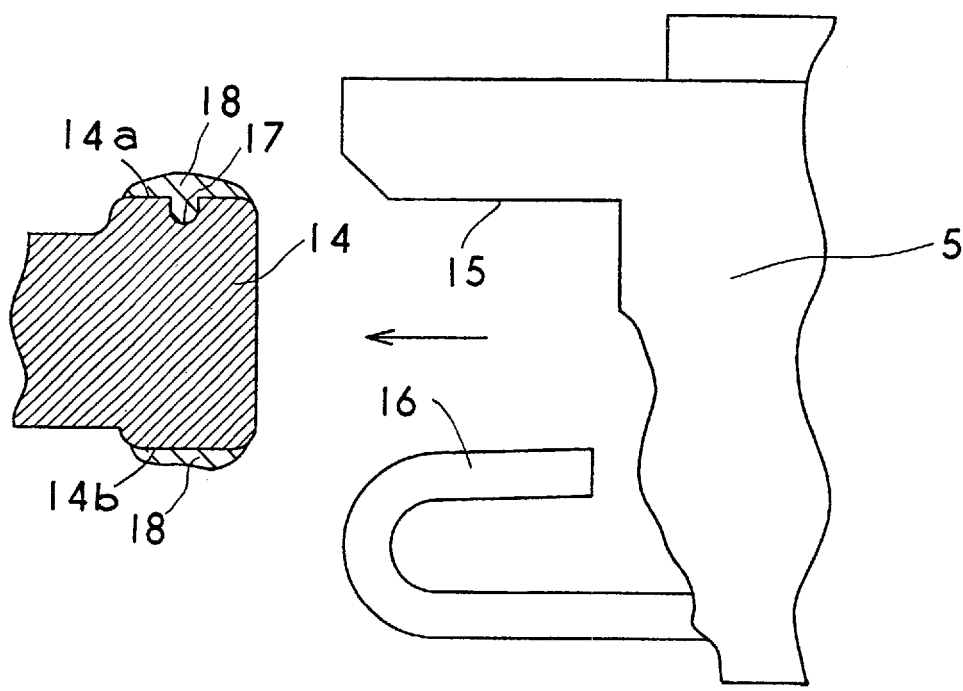
FIG. 5 is a cross-sectional view of a main part of a slide portion of the optical pickup carrying system of the first embodiment shown in FIG. 1.

Referring now to FIG. 1, there is illustrated a perspective view showing an optical pickup carrying system according to a first embodiment of the present invention. Furthermore, FIG. 2 shows a bottom view of the optical pickup carrying system of this embodiment, FIG. 3 shows a side view of the optical pickup carrying system of this embodiment, FIG. 4 shows a perspective view showing a main part of a guide rail of the optical pickup carrying system of this embodiment, and FIG. 5 shows a cross-sectional view of a main part of a slide portion of the optical pickup carrying system of this embodiment.

In these figures, reference numeral 1 denotes a base on which a turn table 2 for placing a disk (a recording medium shaped like a disk) 3 such as a CD-ROM thereon is disposed rotatably, 4 denotes a spindle motor secured to the base 1, for rotating the turn table 2, and 5 denotes an optical pickup mounted to the base 1 such that it can move in the directions indicated by the arrow A shown in FIG. 1, for reading a signal recorded on the disk 3.

Furthermore, reference numeral 6 denotes a thread motor which serves as a driving source for moving the optical pickup 5, 7 denotes a motor base for securing the thread motor 6 to the base 1, 8 denotes a gear fixed on the rotary shaft of the thread motor 6, and 9 denotes a gear rotatably mounted on a shaft secured to the motor base 7.

In addition, reference numeral 10 denotes a screw shaft having a gear 11 engaged with the gear 9 at one end thereof. The screw shaft can rotate together with the gear 11. The thread of the screw shaft 10 is engaged in a nut 12 secured to the optical pickup 5. Therefore, when the screw shaft rotates, the optical pickup 5 is carried in either of the two directions indicated by the arrow A in FIG. 1.

Reference numeral 13 denotes a plate spring for imposing a certain load on the screw shaft 10 in the thrust direction so as to hold the screw shaft 10, and 14 denotes a guide rail which is formed integrally with the base 1 so that the guide rail is extended in parallel with the moving directions of the optical pickup 5 and on which a level positioning member 15 of the optical pickup 5 and a plate spring 16, which will be mentioned below, can slide. The upper and lower surfaces of the guide rail 14 are formed as sliding surfaces 14a and 14b on which the level positioning member 15 of the optical pickup 5 and the plate spring 16 can slide, respectively. The plate spring 16 is secured to the bottom part of the optical pickup 5 to urge the guide rail 14 towards the level positioning member 15. That is, the plate spring 16 and level positioning member 15 are urged towards each other and are pressed against the sliding surfaces 14a and 14b, respectively, so as to hold the guide rail 14 in cooperation with each other. Thus, the level positioning member 15 and plate spring 16 support the optical pickup 5 in cooperation with the guide rail 14 so that upward and downward movements of the optical pickup 5 with respect to the base 1 can be restricted.

Furthermore, reference numeral 17 denotes a groove formed in the sliding surface 14a of the guide rail and running in the direction of moving the pickup 5. The cross-section of the groove is generally U-shaped. The groove 17 serves to store grease 18 therein. Thereby, the storage amount of the grease 18 on the sliding surface 14$a$ of the guide rail 114 can be increased. Furthermore, the groove 17 serves to prevent scattering and a spill of the grease 18 from the sliding surface 14$a$. At least another groove can be further formed in the sliding surface 14$a$ in parallel with the groove 17. Grease 18 is also applied to the sliding surface 14$b$ of the guide rail 114.

Next, a description will be made as to the operation of the optical pickup carrying system of the present embodiment. When the optical pickup 5 reads a signal from a position on the disk 3, a driving voltage from a control circuit board not shown is applied to the thread motor 6. As a result, the driving force of the thread motor 6 is transmitted to the screw shaft 10 by way of the gears 8, 9, and 11, and then it causes the screw shaft 10 to rotate.

When the screw shaft 10 rotates so that the optical pickup 5 having the nut 12 engaged with the screw shaft 10 is moved to the above position in the radial direction of the disk 3, the optical pickup 5 reads a signal recorded on the position of the disk 3. During the movement of the optical pickup 5, the level positioning member 15 and plate spring 16 slide on the sliding surfaces 14$a$ and 14$b$ of the guide rail 14. Accordingly, upward and downward movements of the optical pickup 5 can be restricted.

The grease 18 applied to the sliding surfaces 14$a$ and 14$b$ can serve to reduce the resistance to the sliding movements of the level positioning member 5 and plate spring 16 against the guide rail 14. In this embodiment, since the grease 18 is stored in the groove 17 formed in the sliding surface 14$a$, scattering and a spill of the grease 18 can be prevented as compared with the prior art pickup carrying system mentioned above. Therefore, the longevity of the lubricating agent is increased.

Furthermore, since the groove 17 is formed in the guide rail 14 and is running in the direction of moving the optical pickup 5, an adequate amount of the grease 18 can be applied to a part of the sliding surface 14$a$ where a lot of resistance to sliding movements of the level positioning member 15 is generated. Thus, the effect of lubricating can be enhanced and hence the resistance to sliding movements of the level positioning member 15 can be reduced efficiently.

As mentioned above, according to the first embodiment, since the groove 17 is formed in the sliding surface 14$a$ of the guide rail 14 for storing the grease 18 therein, the longevity of the lubricating agent can be increased and therefore the resistance to sliding movements of the level positioning member 15 can be reduced efficiently. Accordingly, the embodiment offers the advantage of being able to prevent wear in the sliding surface 14$a$ of the guide rail 14 and level positioning member 15 and therefore maintain the accuracy of positioning the optical pickup 5.

Figure 6:
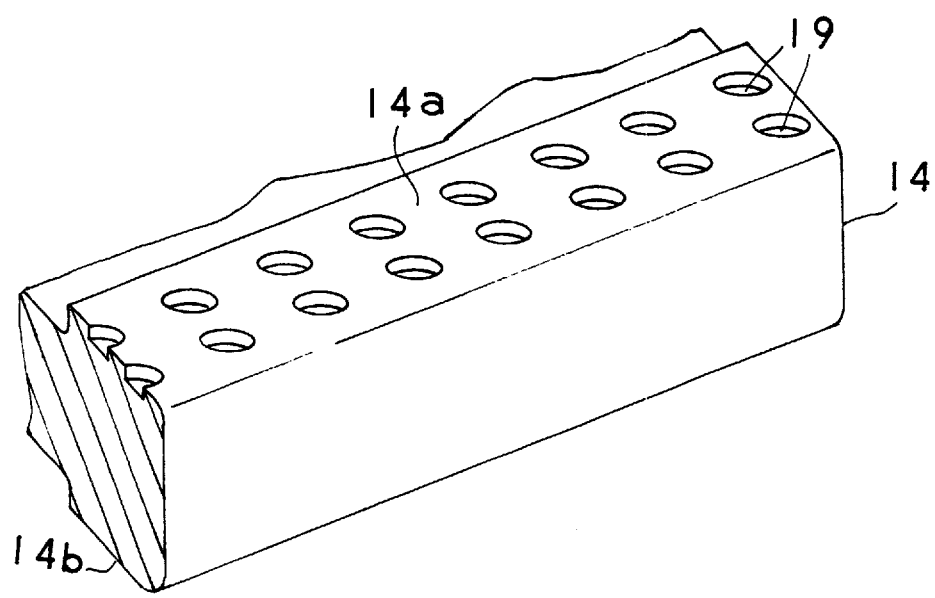
FIG. 6 is a perspective view showing a main part of a guide rail of an optical pickup carrying system of a second embodiment of the present invention.
Figure 7:
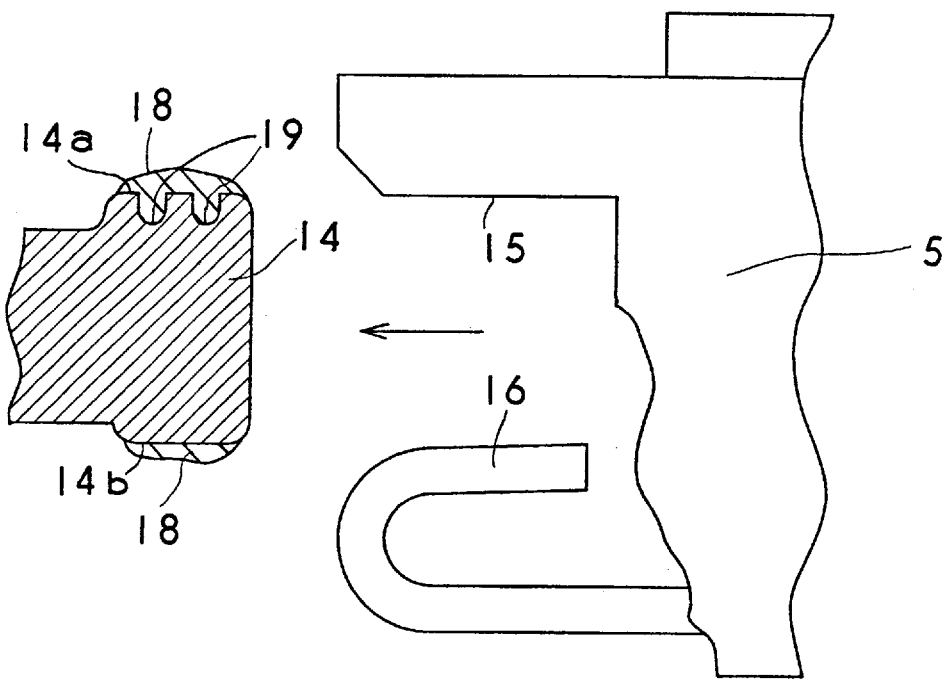
FIG. 7 is a cross-sectional view of a main part of a slide portion of the optical pickup carrying system of the second embodiment shown in FIG. 6.

Referring next to FIG. 6, there is illustrated a perspective view showing a main part of a guide rail of an optical pickup carrying system according to a second embodiment of the present invention. Furthermore, FIG. 7 shows a cross-sectional view showing a main part of a sliding portion of the optical pickup carrying system according to the second embodiment.

In the figures, reference numeral 19 denotes a cavity formed in the sliding surface 14$a$ of the guide rail 19 for storing the grease 18 therein. A plurality of cavities 19 are arranged such that they are running in two rows, and each of them is elliptical in horizontal cross section. Each of the plural cavities 19 is aligned such that the major axis thereof is directed in parallel with the direction of moving the optical pickup 5.

Numerous variants may be made in the exemplary embodiment shown. For example, each of the plural cavities 19 can be of rectangular shape, of circular shape, or of any other shape in horizontal cross section. Furthermore, one row of cavities 19 can be formed in the sliding surface 14$a$, and three or more rows of cavities 19 can be alternatively disposed in the sliding surface 14$a$. Since the other structure of the pickup carrying system of this embodiment is the same as that of the first embodiment, the description about the other structure will be omitted hereinafter.

Next, a description will be made as to the operation of the optical pickup carrying system of this embodiment. The basic operation of the optical pickup carrying system of this embodiment is the same as that of the first embodiment, and therefore the description about the basic operation will be omitted hereinafter. In this embodiment, since the grease 18 is stored in the plurality of cavities 19 formed in the sliding surface 14$a$, scattering and a spill of the grease 18 can be prevented as compared with the above-mentioned prior art pickup carrying system. Therefore, the longevity of the lubricating agent is increased.

Furthermore, since the two rows of cavities 19 arranged in the guide rail 14 are running in parallel with the direction of moving the optical pickup 5, an adequate amount of the grease 18 can be applied to a part of the sliding surface 14$a$ where a lot of resistance to sliding movements of the level positioning member 15 is generated. Thus, the effect of lubricating can be enhanced and hence the resistance to sliding movements of the level positioning member 15 can be reduced efficiently.

As mentioned above, according to the second embodiment, since the plurality of cavities 19 for storing the grease 18 therein are formed in the sliding surface 14$a$ of the guide rail 14, the longevity of the lubricating agent can be increased and therefore the resistance to sliding movements of the level positioning member 15 can be reduced efficiently. Accordingly, the embodiment offers the advantage of being able to prevent wear in the sliding surface 14$a$ of the guide rail 14 and level positioning member 15 and therefore maintain the accuracy of positioning the optical pickup 5.

Figure 8:
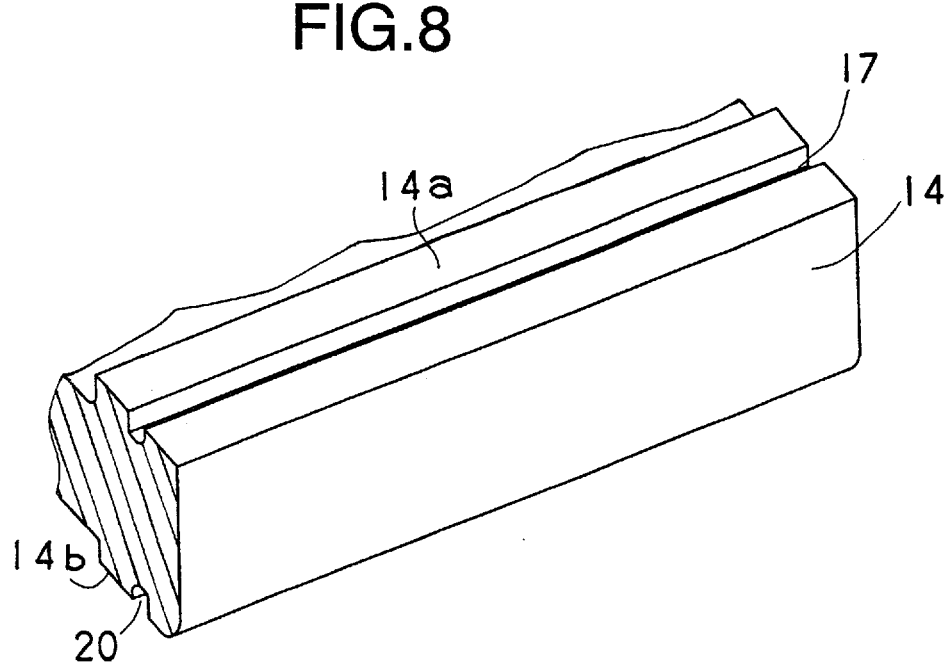
FIG. 8 is a perspective view showing a main part of a guide rail of an optical pickup carrying system of a third embodiment of the present invention.
Figure 9:
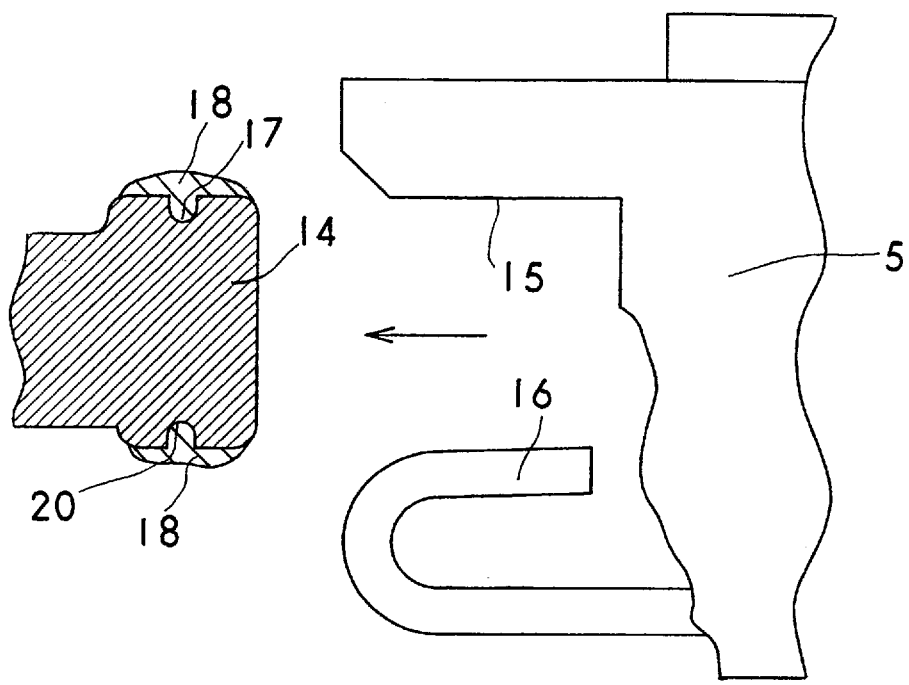
FIG. 9 is a cross-sectional view of a main part of a slide portion of the optical pickup carrying system of the third embodiment shown in FIG. 8.

Referring next to FIG. 8, there is illustrated a perspective view showing a main part of a guide rail of an optical pickup carrying system according to a third embodiment of the present invention. Furthermore, FIG. 9 shows a cross-sectional view showing a main part of a sliding portion of the optical pickup carrying system according to the third embodiment.

In the figures, reference numeral 20 denotes a groove formed in the sliding surface 14$b$ of the guide rail 14 for storing the grease 18. The groove 20 is running in parallel with the direction of moving the optical pickup 5. That is, the groove 20 is formed in the sliding surface 14$b$ similarly to the groove 17 formed in the sliding surface 14$a$. Since the other structure of the pickup carrying system of this embodiment is the same as that of the first embodiment, the description about the other structure will be omitted hereinafter.

Next, a description will be made as to the operation of the optical pickup carrying system of this embodiment. The basic operation of the optical pickup carrying system of this embodiment is the same as that of the first embodiment, and therefore the description about the basic operation will be omitted hereinafter. In this embodiment, since the grease 18 is also stored in the groove 20 formed in the sliding surface 14b, scattering and a spill of the grease 18 from the sliding surface 14b can be prevented as compared with the above-mentioned prior art pickup carrying system. Therefore, the longevity of the lubricating agent is increased.

Furthermore, since the groove 20 is formed in the guide rail 14 and is running in parallel with the direction of moving the optical pickup 5, an adequate amount of the grease 18 can be applied to a part of the sliding surface 14b where a lot of resistance to sliding movements of the plate spring 16 is generated. Thus, the effect of lubricating can be enhanced and hence the resistance to sliding movements of the plate spring 16 can be reduced efficiently.

As mentioned above, according to the third embodiment, since the groove 20 for storing the grease 18 therein is formed in the sliding surface 14b of the guide rail 14, the longevity of the lubricating agent can be increased and therefore the resistance to sliding movements of the level positioning member 15 and spring plate 16 can be reduced efficiently. Accordingly, the embodiment offers the advantage of being able to prevent wear in the sliding surface 14b of the guide rail 14 and spring plate 16 as well as wear in the sliding surface 14a of the guide rail 14 and level positioning member 15, and therefore position the optical pickup 5 with a higher degree of accuracy as compared with the first embodiment.

Figure 10:
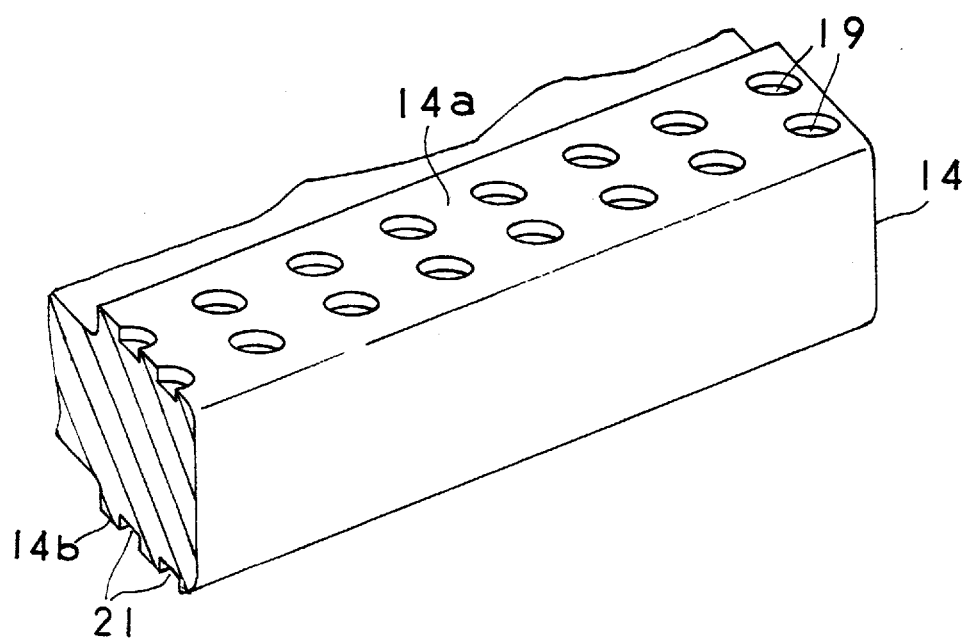
FIG. 10 is a perspective view showing a main part of a guide rail of an optical pickup carrying system of a fourth embodiment of the present invention.
Figure 11:
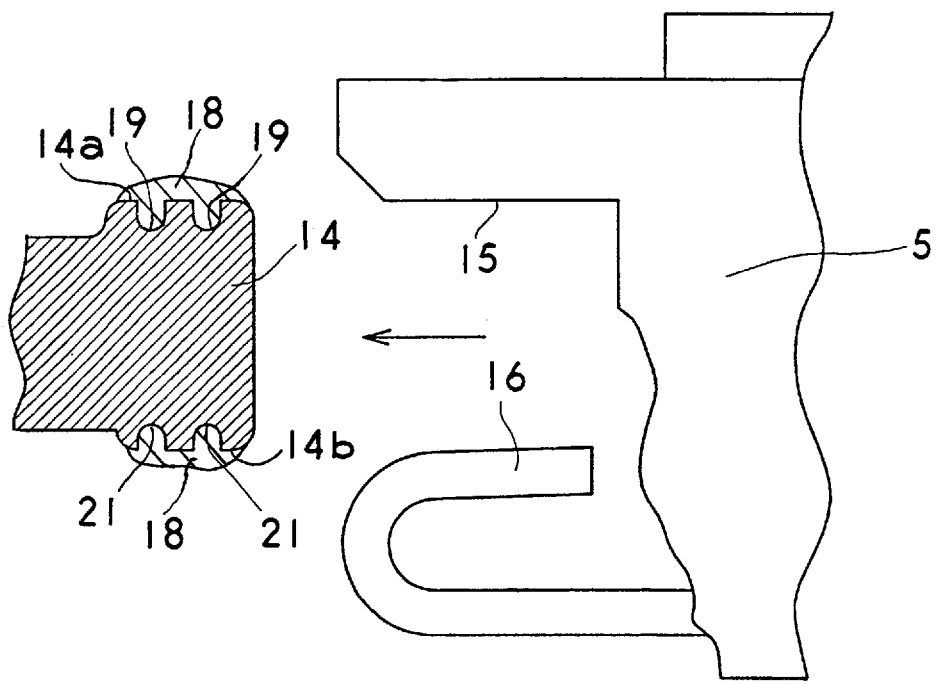
FIG. 11 is a cross-sectional view of a main part of a slide portion of the optical pickup carrying system of the fourth embodiment shown in FIG. 10.

Referring next to FIG. 10, there is illustrated a perspective view showing a main part of a guide rail of an optical pickup carrying system according to a fourth embodiment of the present invention. Furthermore, FIG. 11 shows a cross-sectional view showing a main part of a sliding portion of the optical pickup carrying system according to the fourth embodiment.

In the figures, reference numeral 21 denotes a cavity for storing the grease 18 in the sliding surface 14b of the guide rail 14. A plurality of cavities 21 are arranged such that they are running in two rows, and each od them is elliptical in horizontal cross section. Each of the plural cavities 21 is aligned such that the major axis thereof is directed in parallel with the direction of moving the optical pickup 5. Since the other structure of the pickup carrying system of this embodiment is the same as that of the second embodiment, the description about the other structure will be omitted hereinafter.

Next, a description will be made as to the operation of the optical pickup carrying system of this embodiment. The basic operation of the optical pickup carrying system of this embodiment is the same as that of the second embodiment, and therefore the description about the basic operation will be omitted hereinafter. In this embodiment, since the grease 18 is also stored in the plurality of cavities 21 formed in the sliding surface 14b, scattering and a spill of the grease 18 from the sliding surface 14b can be prevented as compared with the above-mentioned prior art pickup carrying system. Therefore, the longevity of the lubricating agent is increased.

Furthermore, since the two rows of cavities 21 are arranged in the guide rail 14 and are running in parallel with the direction of moving the optical pickup 5, an adequate amount of the grease 18 can be applied to a part of the sliding surface 14b where a lot of resistance to sliding movements of the plate spring 16 is generated. Thus, the effect of lubricating can be enhanced and hence the resistance to sliding movements of the plate spring 16 can be reduced efficiently.

As mentioned above, according to the fourth embodiment, since the plurality of cavities 21 for storing the grease 18 therein are formed in the sliding surface 14b of the guide rail 14 in addition to the plurality of cavities 19 in the sliding surface 14a, the longevity of the lubricating agent can be increased and therefore the resistance to sliding movements of the level positioning member 15 and spring plate 16 can be reduced efficiently. Accordingly, the embodiment offers the advantage of being able to prevent wear in the sliding surface 14b of the guide rail 14 and spring plate 16 as well as wear in the sliding surface 14a of the guide rail 14 and level positioning member 15, and therefore position the optical pickup 5 with a higher degree of accuracy as compared with the second embodiment.

Figure 12:
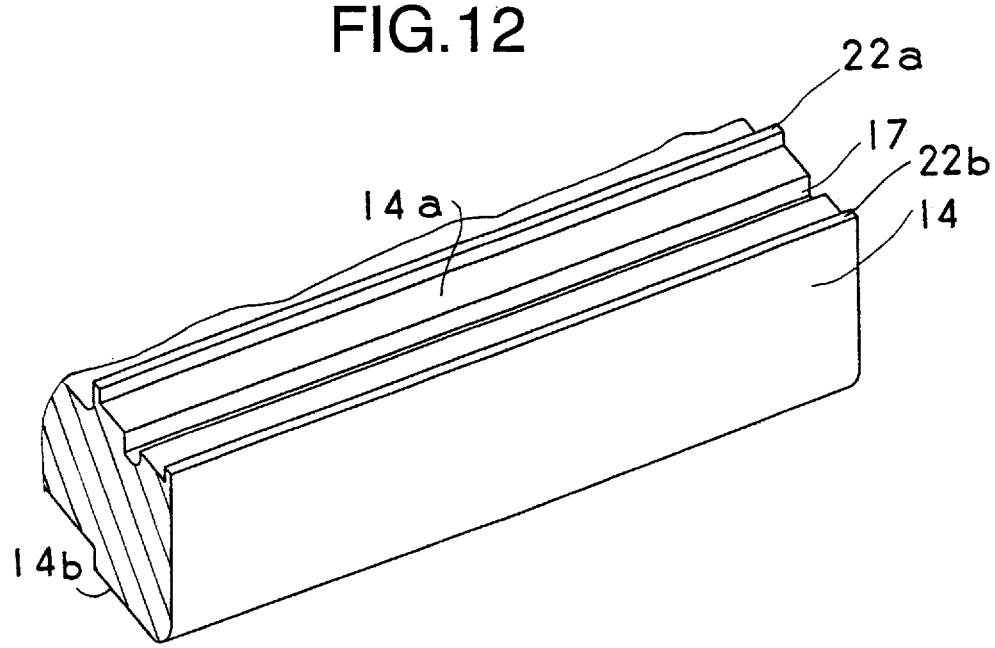
FIG. 12 is a perspective view showing a main part of a guide rail of an optical pickup carrying system of a fifth embodiment of the present invention.
Figure 13:
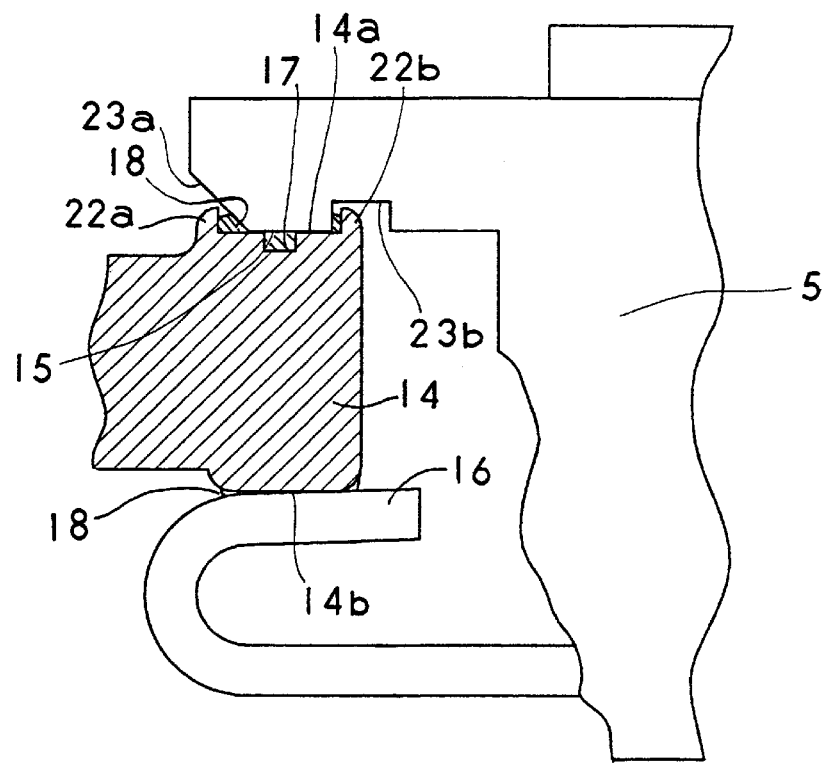
FIG. 13 is a cross-sectional view of a main part of a slide portion of the optical pickup carrying system of the fifth embodiment shown in FIG. 12.
Figure 18:
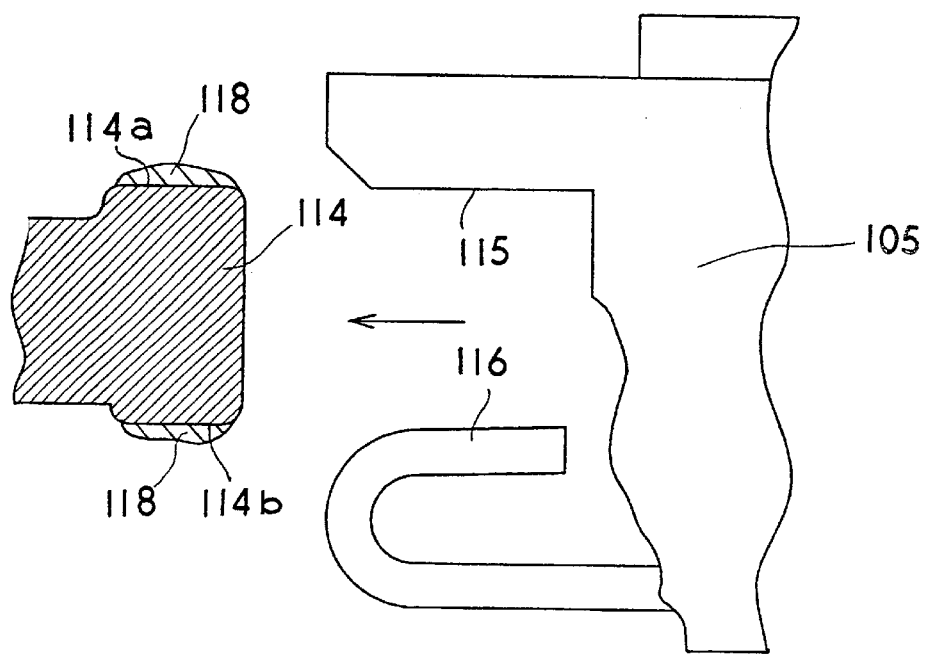
FIG. 18 is a cross-sectional view of a main part of a slide portion of the prior art optical pickup carrying system shown in FIG. 14.
Figure 14:
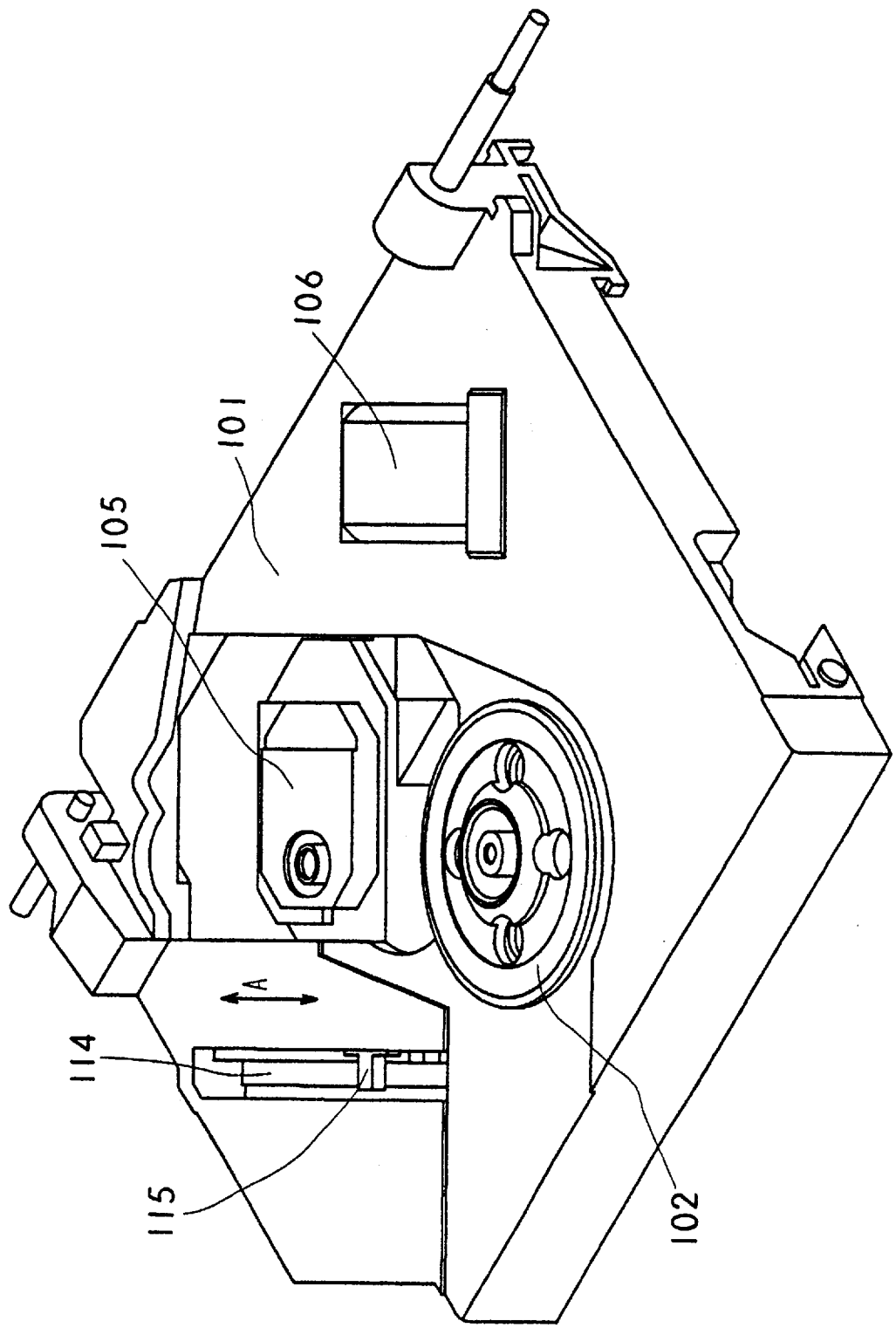
FIG. 14 is perspective view showing a prior art optical pickup carrying system.
Figure 15:
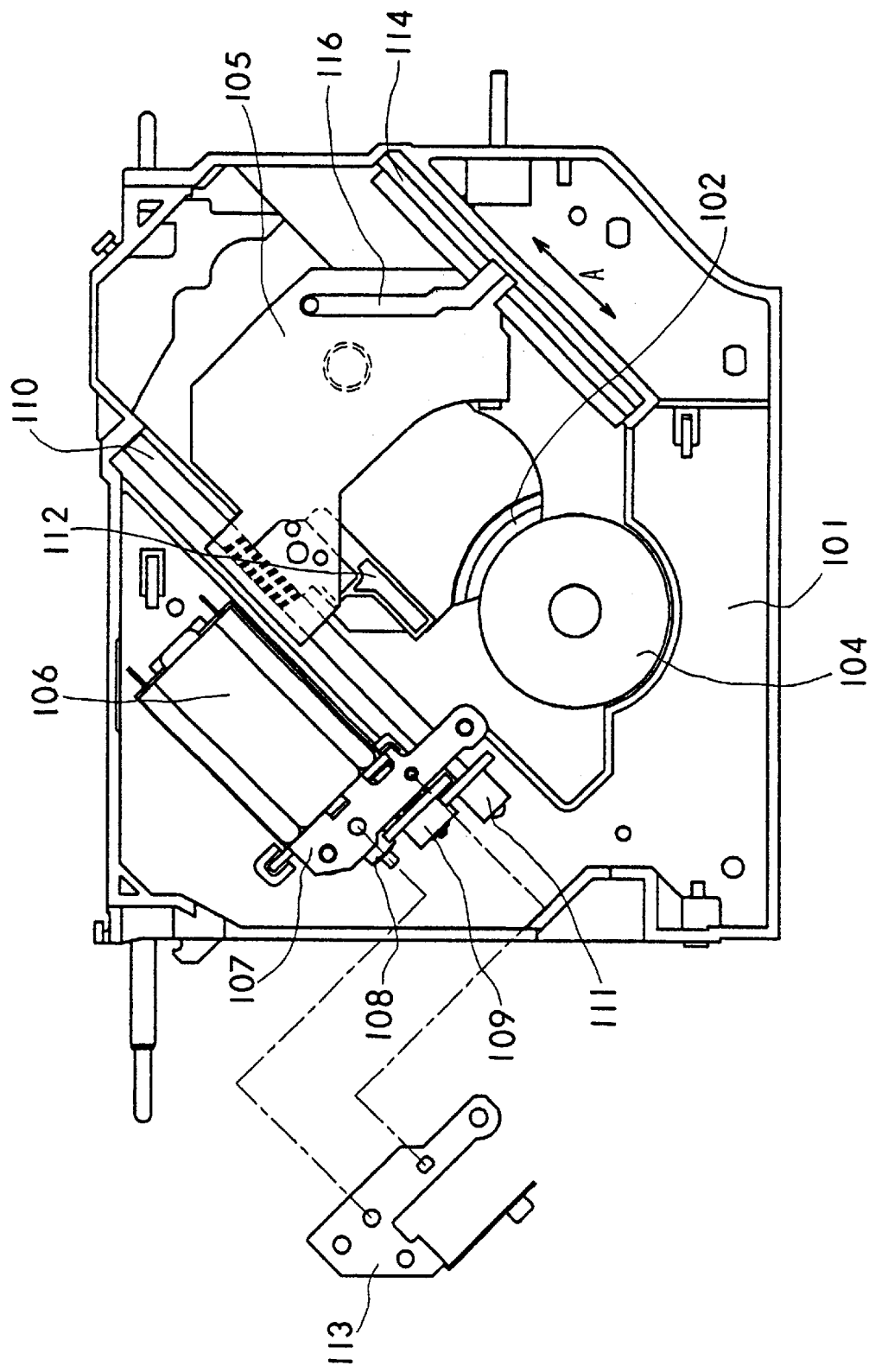
FIG. 15 is a bottom view of the prior art optical pickup carrying system shown in FIG. 14.
Figure 16:
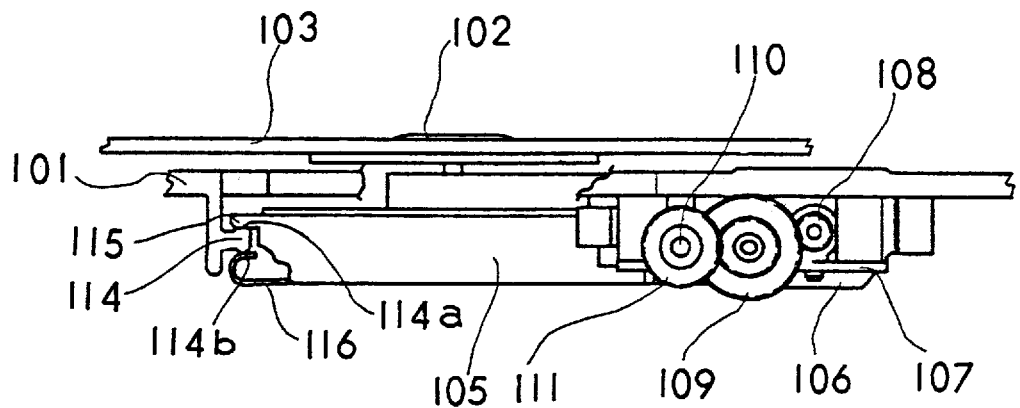
FIG. 16 is a side view of the prior art optical pickup carrying system shown in FIG. 14.
Figure 17:
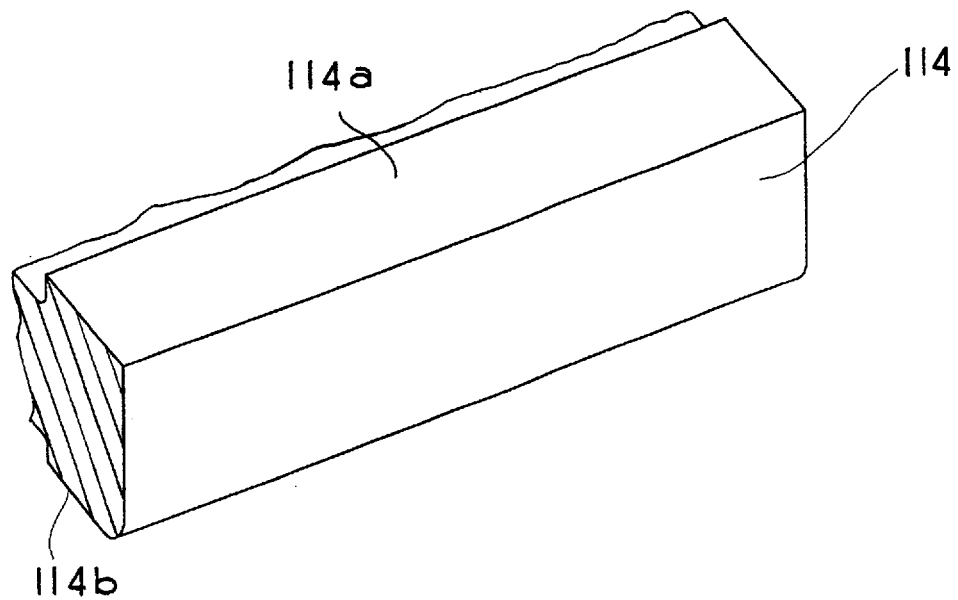
FIG. 17 is a perspective view showing a main part of a guide rail of the prior art optical pickup carrying system shown in FIG. 14.

Referring next to FIG. 12, there is illustrated a perspective view showing a main part of a guide rail of an optical pickup carrying system according to a fifth embodiment of the present invention. Furthermore, FIG. 13 shows a cross-sectional view showing a main part of a sliding portion of the optical pickup carrying system according to the fifth embodiment.

In the figures, reference numerals 22a and 22b denote a pair of projecting portions formed opposite to each other at both of longitudinal sides of the sliding surface 14a of the guide rail 14, respectively, for preventing the grease 18 from flowing out of the both sides of the sliding surface 14a. In FIG. 13, reference numerals 23a and 23b denote a pair of notch portions formed in one surface of the level positioning member 15 of the optical pickup 5, which abuts on the sliding surface 14a of the guide rail 14, so that the pair of projecting portions 22a and 22b of the guide rail can be passed smoothly through the pair of notch portions 23a and 23b when the optical pickup moves. Since the other structure of the pickup carrying system of this embodiment is the same as that of the second embodiment, the description about the other structure will be omitted hereinafter.

Next, a description will be made as to the operation of the optical pickup carrying system of this embodiment. The basic operation of the optical pickup carrying system of this embodiment is the same as that of the first embodiment, and therefore the description about the basic operation will be omitted hereinafter. In this embodiment, since the pair of projecting portions 22a and 22b is disposed such that they project from both of the longitudinal sides of the sliding surface 14a of the guide rail 14, respectively, the grease 18 can be prevented from flowing out from the both sides of the sliding surface 14a. Thus, the longevity of the lubricating agent can be increased as compared with the first embodiment mentioned above. During the movement of the optical pickup 5, the pair of projecting portions 22a and 22b of the guide rail can be passed smoothly through the pair of notch portions 23a and 23b.

As mentioned above, according to the fifth embodiment, since the pair of projecting portions 22a and 22b is formed at both of the longitudinal sides of the sliding surface 14a of the guide rail 14, the longevity of the lubricating agent can be increased as compared with the first embodiment and therefore the resistance to sliding movements of the level positioning member 15 against the sliding surface 14a can be reduced efficiently. Accordingly, the embodiment offers the advantage of being able to prevent wear in the sliding surface 14a of the guide rail 14 and level positioning member 15 and therefore position the optical pickup 5 with a higher degree of accuracy as compared with the first embodiment.

As previously explained, the present invention offers the following advantages.

In accordance with a preferred embodiment of the present invention, there is provided an optical pickup carrying system comprising a base, an optical pickup, a level positioning member for supporting the optical pickup in cooperation with a plate spring, a guide rail disposed in the base and provided with upper and lower sliding surfaces on which the level positioning member and plate spring can slide when the optical pickup moves, respectively, for guiding and supporting the optical pickup in cooperation with the level positioning member, and a lubricating agent storing mechanism formed in the guide rail for storing a lubricating agent to furnish it to at least one of the two sliding surfaces. Therefore, the embodiment offers the advantage of being able to prevent wear in the sliding surface of the guide rail and level positioning member and therefore maintain the accuracy of positioning the optical pickup.

In accordance with another preferred embodiment of the present invention, the lubricating agent storing mechanism includes at least one groove formed in the upper sliding surface which is contact with the level positioning member and running in parallel with a direction of moving the optical pickup. Therefore, the embodiment offers the advantage of being able to supply an adequate of the lubricating agent into a gap between the upper surface of the guide rail and the level positioning member where a lot of resistance to sliding movements of the level positioning member is generated and hence reduce the resistance effectively.

In accordance with another preferred embodiment of the present invention, the lubricating agent storing mechanism includes at least one groove formed in the upper sliding surface which is contact with the level positioning member and running in parallel with the direction of moving the optical pickup, and at least one groove formed in the lower sliding surface which is contact with the plate spring and running in parallel with the direction of moving the optical pickup. Therefore, the embodiment offers the advantage of being able to supply an adequate amount of the lubricating agent into a gap between the upper surface of the guide rail and the level positioning member where a lot of resistance to sliding movements of the level positioning member is generated and a gap between the lower surface of the guide rail and the plate spring where a lot of resistance to sliding movements of the plate spring is generated, and hence reduce the resistance more effectively.

In accordance with another preferred embodiment of the present invention, the lubricating agent storing mechanism includes at least one row of plural cavities formed in the upper sliding surface which is contact with the level positioning member and running in parallel with a direction of moving the optical pickup. Therefore, the embodiment offers the advantage of being able to supply an adequate of the lubricating agent into a gap between the upper surface of the guide rail and the level positioning member where a lot of resistance to sliding movements of the level positioning member is generated and hence reduce the resistance effectively.

In accordance with another preferred embodiment of the present invention, the lubricating agent storing mechanism includes at least one row of plural cavities formed in the upper sliding surface which is contact with the level positioning member and running in parallel with the direction of moving the optical pickup, and at least one row of plural cavities formed in the lower sliding surface which is contact with the plate spring and running in parallel with the direction of moving the optical pickup. Therefore, the embodiment offers the advantage of being able to supply an adequate amount of the lubricating agent into a gap between the upper surface of the guide rail and the level positioning member where a lot of resistance to sliding movements of the level positioning member is generated and a gap between the lower surface of the guide rail and the plate spring where a lot of resistance to sliding movements of the plate spring is generated, and hence reduce the resistance more effectively.

In accordance with another preferred embodiment of the present invention, the guide rail includes a pair of projecting portions projected from both of longitudinal sides of the upper sliding surface, and the level positioning member includes a pair of notch portions through which the pair of projecting portions can be passed when the optical pickup moves. Therefore, the embodiment offers the advantage of being able to prevent the lubricating agent from flowing out of the both sides of the upper sliding surface of the guide rail.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical pickup carrying system comprising:
    a base having a turn table disposed thereon for rotating a recording medium;
    an optical pickup, movably disposed on said base, for reading information from the recording medium;
    a support means coupled to said optical pickup for supporting said optical pickup;
    a guide rail disposed on said base, said guide rail having at least one sliding surface on which said support means can slide so as to move said optical pickup along said guide rail; and
    lubricating agent storing means formed as at least one depression in at least one sliding surface of said guide rail for retaining lubricating agent previously provided on the sliding surface,
    wherein said guide rail has an upper sliding surface and a lower sliding surface on which said support means can slide, and said lubricating agent storing means retains lubricating agent on at least one of the two sliding surfaces,
    wherein said lubricating agent storing means includes at least one row of plural cavities formed on at least one of the upper sliding surface and lower sliding surface and running in parallel with a direction of optical pickup movement.

2. The optical pickup carrying system according to claim 1, wherein said lubricating agent storing means includes at least one groove formed on at least one of the upper sliding surface and the lower sliding surface of said guide rail and running in parallel with a direction of optical pickup movement.

3. The optical pickup carrying system according to 1, wherein said lubricating agent storing means includes at least one row of cavities formed on the upper sliding surface and running in parallel with the direction of optical pickup movement, and at least one row of cavities formed on the lower sliding surface and running in parallel with the direction of optical pickup movement.

4. The optical pickup carrying system according to claim 1, wherein said guide rail is solid.

* * * * *